UNITED STATES PATENT OFFICE 2,477,218

VINYL ETHERS AND POLYMERS THEREOF

Henry Theron Thompson, Easton, Pa., assignor to General Aniline & Film Corporation, New York, N. Y., a corporation of Delaware No Drawing. Application December 23, 1944, Serial No. 569,652

9 Claims. (Cl. 260—90)

This invention relates to new vinyl ethers and to polymers thereof.

The vinyl ethers of my invention are characterized by containing an acetal group linked to a vinyloxy group through an aliphatic hydrocarbon chain containing at least 2 carbon atoms. The new compounds have the general formula:

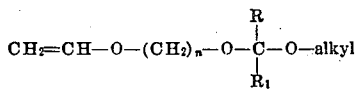

wherein R and $R_1$ represent H or a hydrocarbon radical which may be alkyl, cycloalkyl, aralkyl or aryl, and $n$ is an integer greater than 1. The radicals R and $R_1$ may be like or unlike.

The new vinyl ethers may be prepared by addition reaction between acetylene and diether alcohols having the general formula:

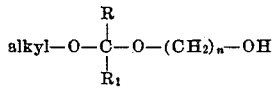

wherein R and $R_1$, and $n$ have the aforesaid significance. Specific examples illustrative of this class of alcohols are: methoxymethoxyethanol, propoxymethoxyethanol, methyl beta-hydroxy ethyl acetal, ethoxymethoxypropanol-3, butoxymethoxybutanol-4, etc.

The diether alcohols may be prepared by reaction between the corresponding aliphatic, cycloaliphatic, arylaliphatic, or aromatic aldehydes or ketones, on the one hand, and primary monohydric aliphatic alcohols in conjunction with glycols of the polymethylene series in which the hydroxy groups are located on the terminal carbon atoms, on the other, or by reaction of the glycols with the acetals or ketals derived from the aldehydes or ketones, respectively, and the monohydric alcohols. Depending on whether the carbon atom to which the ether oxygen atoms of the acetal group of the vinyl ethers are bound is to be once or twice substituted by a hydrocarbon radical, the aldehydes or the ketones, or their corresponding acetals or ketals, are reacted with the glycols for the preparation of the diether alcohols. The preparation of these diether alcohols may be accomplished in known way following the process described in U. S. P. 2,321,542, in which case the aldehyde or the ketone is reacted with the monohydric alcohol and the glycol, or, as is preferred, they may be prepared in accordance with the process described in British Patent 543,030 by reaction of the corresponding acetals or ketals with the glycols.

Aldehydes and ketones which may be used for the preparation of the above-defined diether alcohols are, for example, formaldehyde, acetaldehyde, propionaldehyde, butyraldehyde, isobutyraldehyde, valeraldehyde, isovaleraldehyde, heptaldehyde, hexahydrobenzaldehyde, phenylacetaldehyde, phenylpropionaldehyde, benzaldehyde, naphthaldehyde, acetone, methyl ethyl ketone, diethyl ketone, dipropyl ketone, ethyl propyl ketone, dicyclohexyl ketone, hexahydropropiophenone, acetophenone, propiophenon, butyrophenone, 1-phenyl-2-propanone, benzophenone, etc. Illustrative of the monohydric aliphatic alcohols and the glycols which may be employed in the preparation of the diether alcohols are, for example, methanol, ethanol, propanol, isopropanol, butanol, isobutanol, octanol, dodecanol, ethylene glycol, trimethylene glycol, tetramethylene glycol, hexamethylene glycol, octamethylene glycol, decamethylene glycol, etc.

The addition reaction between acetylene and the diether alcohols for the production of the new vinyl ethers may be effected by heating acetylene and the diether alcohol to reaction temperature in the presence of a strongly alkaline agent as catalyst in accordance with the process described in U. S. P. 1,959,927. The alkaline catalyst, e. g., KOH or potassium alcoholate, may be employed in the proportions described in this patent. The formed vinyl ether may be separated from the reaction mixture by fractional distillation.

The reaction may be carried out at atmospheric or at higher pressures, it being necessary, however, to conduct the reaction in a closed vessel under elevated pressures where the boiling point of the diether alcohol is below the reaction temperature. For effecting the reaction at atmospheric pressure a current of acetylene may be led through the diether alcohol-catalyst mixture contained in a vessel open to the atmosphere. For elevated pressure operation of the process, acetylene in the form of a nonexplosive mixture with nitrogen or other inert gas is forced into a pressure vessel containing the diether alcohol and alkaline catalyst, the reaction mixture being placed under agitation. The pressure employed is not critical and may be varied in accordance with the boiling points of the diether alcohols and the reaction temperatures therefor, addition of the acetylene mixture being made from time to time as required by pressure conditions and consumption of acetylene in the reaction.

The temperature to which the acetylene and diether alcohol must be heated to initiate reaction depends in each instance on the diether alcohol employed, and, in general, is the higher the higher the molecular weight of the diether alcohol. It may be determined in any particular instance by conducting the reaction at elevated pressures in an autoclave and observing the temperature on initial pressure drop, this pressure drop being indicative of initiation of consumption of acetylene in the reaction.

This invention is further illustrated by the following specific example in which vinyl methoxymethoxyethyl ether is prepared from methoxymethoxyethyl alcohol. Parts are by weight. The invention is not restricted to this example, however, as any of the herein-defined diether alcohols may be reacted with acetylene in like manner for the production of the corresponding vinyl ethers, the reaction being perfectly general in its application to the diether alcohols for the production of the vinyl ethers.

*Example 1*

100 parts of methoxymethoxyethanol in which was dissolved 5 parts of KOH was charged into a rocker type bomb. Agitation was set up in the mixture by rocking of the bomb and a mixture of acetylene and nitrogen in the molar ratio of 1:3 was pressed in. The contents of the bomb were then heated and the temperature allowed to rise to a maximum of 150° C. Reaction took place over a period of 27 hours under a maximum pressure of 175 pounds per square inch, further quantities of the acetylene-nitrogen mixture being fed in from time to time as required by the reaction. The reaction mixture discharged from the vessel was fractionally distilled and yielded a product consisting of 78 parts of a colorless liquid boiling at 74–76° C. at 50 mm. pressure. A further fractional distillation of the product gave pure vinyl methoxymethoxyethyl ether boiling at 76° C. at 50 mm. pressure.

The new vinyl ethers may be used as solvents, as thinners for lacquers, as ingredients for insecticides and as ingredients for paint and varnish removers.

The vinyl ethers of the invention may be polymerized by the portionwise addition thereto of a small amount of an acid-reacting condensing agent which acts as catalyst or promoter for the polymerization, e. g., aluminum chloride, boron fluoride, boron fluoride-diethyl ether addition compound. The acid catalyst may be employed in the proportions set forth in U. S. Patents 2,104,000 and 2,061,934, and is added in the form of a very dilute solution or suspension in an organic liquid which is inert to the polymerization reaction. The polymerization is preferably carried out in the presence of a liquid organic diluent, for example, a liquid or liquefied hydrocarbon or chlorinated hydrocarbon, e. g., benzene, propane, butane, chloroform, etc., although it may be carried out in the absence of a diluent. The reaction may be conducted at temperatures ranging from subzero up to elevated temperatures and cooling may be employed to control the reaction. The consistency of the polymers will vary depending on the temperature of the polymerization and on the catalyst and diluent employed. The polymerization of the new vinyl ethers is illustrated by the following specific examples in which parts are by weight.

*Example 2*

To a mixture of 132 parts of vinyl methoxymethoxyethyl ether in 36 parts of chloroform was added, at 20° C., 0.4 part of a 1% solution of boron fluoride-diethyl ether addition compound in diethyl ether. An exothermic reaction set in and the temperature was held below 50° C. by external cooling. As the reaction progressed the viscosity of the reaction mixture increased considerably, and when the temperature had fallen to 30° C., sufficient aqueous ammonia solution was mixed with the reaction mass to quench or inactivate the boron fluoride present therein. After evaporation of the chloroform, polymeric vinyl methoxymethoxyethyl ether in the form of a viscous liquid was obtained.

*Example 3*

To a mixture of equal parts of vinyl methoxymethoxyethyl ether and chloroform a 1% solution of boron fluoride-diethyl ether addition compound in diethyl ether was added dropwise until reaction was initiated as evidenced by a rise in temperature. As the temperature was allowed to rise the reaction mixture became increasingly viscous, finally setting to a gel. After mixing the mass with aqueous ammonia to inactivate the boron fluoride present and evaporating the chloroform, there remained a polymer of vinyl methoxymethoxyethyl ether in the form of a friable solid.

I claim:

1. Vinyl ethers of the general formula:

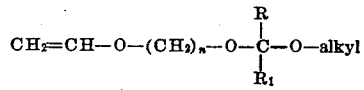

wherein R and $R_1$ are selected from the group consisting of hydrogen and alkyl, aralkyl and aryl hydrocarbon radicals, and $n$ is an integer greater than 1.

2. Vinyl ethers of the general formula:

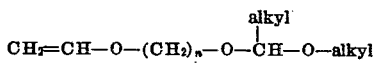

wherein $n$ is an integer greater than 1.

3. Vinyl ethers of the general formula:

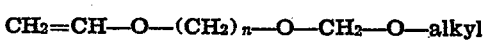

wherein $n$ is an integer greater than 1.

4. Vinyl ethers of the general formula:

5. Vinyl methoxymethoxyethyl ether.

6. A polymer of a vinyl ether of the general formula:

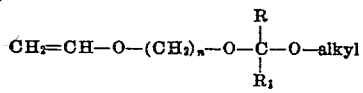

wherein R and $R_1$ are selected from the group consisting of hydrogen and alkyl, aralkyl and aryl hydrocarbon radicals, and $n$ is an integer greater than 1.

7. A polymer of vinyl ether of the general formula:

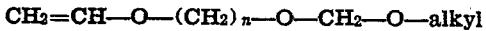

wherein $n$ is an integer greater than 1.

8. A polymer of a vinyl ether of the general formula:

9. Polymeric vinyl methoxymethoxyethyl ether.

HENRY THERON THOMPSON.

No references cited.